United States Patent
Wang et al.

(10) Patent No.: US 12,406,113 B2
(45) Date of Patent: Sep. 2, 2025

(54) COMPUTER-AIDED ENGINEERING TOOLKIT FOR SIMULATED TESTING OF PRESSURE-CONTROLLING COMPONENT DESIGNS

(71) Applicant: Schlumberger Technology Corporation, Sugar Land, TX (US)

(72) Inventors: Yaou Wang, Sugar Land, TX (US); Christopher Nault, Houston, TX (US); Matthew Givens, Houston, TX (US); Micah Threadgill, Cypress, TX (US); William Berry, Houston, TX (US); Ke Ken Li, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 608 days.

(21) Appl. No.: 17/307,474

(22) Filed: May 4, 2021

(65) Prior Publication Data

US 2021/0342506 A1    Nov. 4, 2021

Related U.S. Application Data

(60) Provisional application No. 63/019,763, filed on May 4, 2020.

(51) Int. Cl.
*G06F 30/23* (2020.01)
*G06F 30/12* (2020.01)
(Continued)

(52) U.S. Cl.
CPC .............. *G06F 30/23* (2020.01); *G06F 30/12* (2020.01); *G06F 30/17* (2020.01); *G06F 2111/04* (2020.01)

(58) Field of Classification Search
CPC .......... G06F 30/23; G06F 30/12; G06F 30/17; G06F 2111/04; G06F 2113/14;
(Continued)

(56) References Cited

U.S. PATENT DOCUMENTS 7,027,968 B2    4/2006  Choe et al.
8,214,188 B2 *  7/2012  Bailey ...................... E21B 7/00
                                                        702/6
(Continued)

FOREIGN PATENT DOCUMENTS

JP            H1186036 A  *  3/1999

OTHER PUBLICATIONS

De, Suvranu. "Abaqus handout." (pre-2014). MANE 4240/ CIVL 4240: Introduction to Finite Elements, Rensselaer Polytechnic Institute. <available https://www.academia.edu/download/64063222/abaqustutorial-120314100215-phpapp01.pdf> (Year: 2014).*
(Continued)

*Primary Examiner* — Emerson C Puente
*Assistant Examiner* — Daniel E Miller
(74) *Attorney, Agent, or Firm* — Jeffrey D. Frantz

(57) ABSTRACT

A computer-aided engineering (CAE) toolkit is disclosed that streamlines and automates aspects of a CAE simulation to validate the designs of pressure-controlling components, such as BOP rams. The CAE toolkit enables a designer to provide a model of a pressure-controlling component, and to provide property values that describe aspects of the system to be modeled. Based on these inputs, the CAE toolkit generates a model for the system that includes the pressure-controlling component, as well as any other components that will be part of the simulation. The CAE toolkit can automatically generate a finite element analysis (FEA) model from the system model, and then use the FEA model to perform a simulation of the pressure-controlling component
(Continued)

during operation. The CAE toolkit enables a designer with no training or experience with CAE or FEA techniques to perform and automate simulations of the operation of a pressure-controlling component design.

14 Claims, 16 Drawing Sheets

(51) Int. Cl.
    *G06F 30/17*     (2020.01)
    *G06F 111/04*     (2020.01)
(58) Field of Classification Search
    CPC ...... G06F 30/25; G06F 30/367; G06F 30/398; G06F 2111/00–2119/22; G06F 30/00; G06F 30/18; G06F 30/20; G06F 30/30; G06F 30/327; G06F 30/33; G06F 30/3312; G06F 30/34; G06F 30/36; G06F 30/39; G06F 30/392; G06F 30/394
    See application file for complete search history.

(56) References Cited

U.S. PATENT DOCUMENTS

| | | |
|---|---|---|
| 11,429,766 B2 | 8/2022 | Wang et al. |
| 2008/0027693 A1 | 1/2008 | Khandoker |
| 2016/0070024 A1 | 3/2016 | Berard et al. |
| 2016/0237804 A1* | 8/2016 | Papadimitriou ........ E21B 17/01 |
| 2018/0106143 A1 | 4/2018 | Min et al. |

OTHER PUBLICATIONS

Ghosh, Dipankar, and Garret Vanderplaats. "Development of a Design Optimization Interface to ABAQUS." In ABAQUS Western Users Regional Conference, Hilton and Towers Airport Hotel, Los Angeles, California. 1997. (Year: 1997).*
Tulimilli, Bhaskar Rao, et al. "Experimental and numerical investigation of BOP shear ram performance." In International Conference on Offshore Mechanics and Arctic Engineering, vol. 45387, p. V01BT01A057. ASME 2014 (Year: 2014).*
Harildstad, Erling, and Andreas Haukanes. "Effects of BOP stack modelling on estimated wellhead fatigue damage." Master's thesis, Institutt for marin teknikk, 2013. (Year: 2013).*
Okereke, Michael, and Simeon Keates. "Finite element applications." Cham: Springer International Publishing AG (2018). (Year: 2018).*
Liu, Xinru, Xuli Han, Duanfeng Liu, and Li Tan. "Controllable density grid generation with boundary constrains." In 2010 International Conference on Computer Application and System Modeling (ICCASM 2010), vol. 8, pp. V8-501. IEEE, 2010. (Year: 2010).*
Shivanna, Kiran H., Srinivas C. Tadepalli, and Nicole M. Grosland. "Feature-based multiblock finite element mesh generation." Computer-Aided Design 42, No. 12 (2010): 1108-1116. (Year: 2010).*
Reinas, Lorents, Torfinn Hórte, Morten Sæther, and Guttorm Grytøyr. "Wellhead fatigue analysis method." In International Conference on Offshore Mechanics and Arctic Engineering, vol. 44335, pp. 693-703. 2011. (Year: 2011).*
Reinås, Lorents, et. al. "Wellhead fatigue analysis method: The effect of variation of lower boundary conditions in global riser load analysis." In International Conference on Offshore Mechanics and Arctic Engineering, vol. 44885, pp. 283-295. American Society of Mechanical Engineers, 2012. (Year: 2012).*
Sahu, Kaushik, and Ian R. Grosse. "Concurrent iterative design and the integration of finite element analysis results." Engineering with Computers 10 (1994): 245-257. (Year: 1994).*
Kissil, A., and H. A. Kamel. "An expert system finite element modeler." In Applications of Artificial Intelligence in Engineering Problems: Proceedings of the 1st International Conference, Southampton University, UK Apr. 1986, pp. 1179-1186. Springer Berlin Heidelberg, 1986. (Year: 1986).*
Chapman, Craig B., and Martyn Pinfold. "Design engineering—a need to rethink the solution using knowledge based engineering." Knowledge-based systems 12, No. 5-6 (1999): 257-267. (Year: 1999).*
Pinfold, Martyn, and Craig Chapman. "The application of knowledge based engineering techniques to the finite element mesh generation of an automotive body-in-white structure." Journal of Engineering Design 10, No. 4 (1999): 365-376. (Year: 1999).*
Koutsolelos, Evangelos. "Numerical analysis of a shear ram and experimental determination of fracture parameters." PhD diss., Massachusetts institute of technology, 2012. (Year: 2012).*
Kalavrytinos, Christos, and Ole Ivar Sievertsen. "A knowledge-based engineering approach for offshore process plant design." In 2014 International Conference on Engineering, Technology and Innovation (ICE), pp. 1-6. IEEE, 2014. (Year: 2014).*
Han et al., "Study of the damage and failure of the shear ram of the blowout preventer in the shearing process", Engineering Failure Analysis, vol. 58, pp. 83-95, 2015.
Tekin et al., "Estimation of shear force for blind shear ram blowout preventers", Research on Engineering Structures & Materials, vol. 1, issue 1, pp. 39-51, Feb. 17, 2015.
Liu et al., "Force prediction in blow-out preventer shearing of drill pipes", Engineering Failure Analysis, vol. 74, pp. 159-171, 2017.
Non-Final Rejection issued in related U.S. Appl. No. 16/398,681 on Mar. 16, 2021; 18 pages.
Final Rejection issued in related U.S. Appl. No. 16/398,681 on Aug. 5, 2021; 25 pages.
Tulimilli et al., Design Study of BOP Shear Rams based on Validated Simulation Model and Sensitivity Studies, Proceedings of the ASME 33rd International Conference on Ocean, Offshore and Arctic Engineering, Jun. 8-13, 2014, OMAE2014-24305, pp. 1-9.
McCleney et al., Modeling of Subsea BOP Shear and Sealing Ability Under Flowing Conditions, Offshore Technology Conference, Houston, Texas, USA, OTC-28906-MS, Spril 30 2018, pp. 1-17.
"Specification for Drill-through Equipment", API specification 16A, American Petroleum Institute, Fourth Edition, Apr. 2017, 155 pages.
"Well Control Equipment Systems for Drilling Wells", API Standard 53,, American Petroleum Institute, Fifth Edition, Dec. 2018, Reaffirmed, May 2023, 86 pages.
"BOP Shear Ram Performance Test Protocol", American Petroleum Institute, API Technical Report 16TR1, First Edition, 2018, 32 pages.
United States Department of the Interior, "Oil and Gas and Sulfur Operations in the Outer Continental Shelf-Blowout Preventer Systems and Well Control Revisions," 84 FR p. 21908 (2019 Well Control Rule), 2019, 369 pages.
Wang, Y. et al., Automation CAE Toolkit Method for Ram BOP Design, Proceedings of ASME International Mechanical Engineering Congress and Exposition, IMECE2020-23769, Nov. 16-19, 2020, 7 pages.

* cited by examiner

COMPUTER-AIDED ENGINEERING TOOLKIT FOR SIMULATED TESTING OF PRESSURE-CONTROLLING COMPONENT DESIGNS

CROSS-REFERENCE TO RELATED APPLICATION

This application claims priority to and the benefit of U.S. Provisional Application No. 63/019,763, entitled "AUTOMATION CAE TOOLKIT METHOD FOR RAM BOP DESIGN" and filed May 4, 2020, which is incorporated by reference herein in its entirety for all purposes.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A blowout preventer (BOP) is installed on a wellhead to seal and control an oil and gas well during various operations. For example, during drilling operations, a drill string may be suspended from a rig through the BOP into a wellbore. A drilling fluid is delivered through the drill string and returned up through an annulus between the drill string and a casing that lines the wellbore. In the event of a rapid invasion of formation fluid in the annulus, commonly known as a "kick," the BOP may be actuated to seal the annulus and to contain fluid pressure in the wellbore, thereby protecting well equipment positioned above the BOP.

BRIEF DESCRIPTION OF THE DRAWINGS

Various features, aspects, and advantages of the present disclosure will become better understood when the following detailed description is read with reference to the accompanying figures in which like characters represent like parts throughout the figures, wherein.

DETAILED DESCRIPTION OF SPECIFIC EMBODIMENTS

Figure 1:
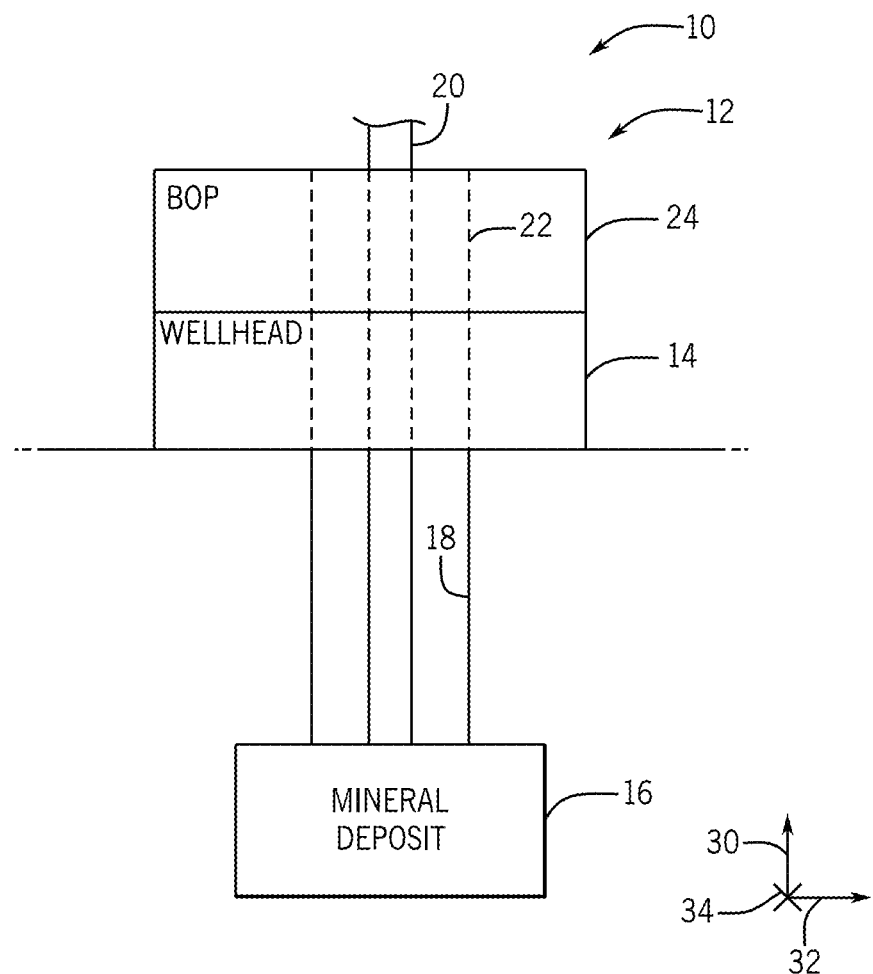
FIG. 1 is a block diagram of a drilling system for mineral extraction, in accordance with an embodiment of the present disclosure.

One or more specific embodiments of the present disclosure will be described below. These described embodiments are only exemplary of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As discussed below, a ram BOP includes two shear rams that, under certain conditions, are moved toward one another to shear a conduit (e.g., a drilling pipe) and to form a seal to block fluid flow across the ram BOP. Since this shearing process occurs within the BOP body, the shearing process is not readily observable. As such, multiple laboratory tests are typically performed on a shear ram design to verify the operation of the ram BOP and to verify the shearing pressure of the conduits. It is presently recognized that this extensive laboratory testing is both expensive and time-consuming. To reduce the volume of laboratory testing performed, computer-aided engineering (CAE) methods may be applied to simulate the shearing process during ram BOP design. However, it is also presently recognized that CAE methods typically involve significant effort of an experienced modeling and simulation engineer to set up the model, run the simulation, and post-process the results into a desirable form. As such, while CAE methods are generally cheaper than laboratory testing, applying a typical CAE method is time-consuming and involves specialized skills and training.

With the foregoing in mind, present embodiments are generally directed to a CAE toolkit that streamlines and automates aspects of a CAE simulation to validate the designs of pressure-controlling components, such as BOP rams. As discussed below, the CAE toolkit enables a designer to provide a model of a pressure-controlling component, and to provide system property values that describe aspects of the system to be modeled (e.g., conduit materials, conduit dimensions, well dimensions). Based on these inputs, the CAE toolkit generates a model for the system that includes the pressure-controlling component, as well as any other components that will be part of the simulation. Additionally, the CAE toolkit can also automatically generate a finite element analysis (FEA) model from the system model, and then use the FEA model to perform a simulation of the pressure-controlling component during operation. For example, when used to simulate the operation of a shear ram BOP, the outputs of the simulation may include a three-dimensional (3D) model that enables visualization of predicted deformation of the conduit and/or the shear rams as a result of the simulated conduit shearing process. The outputs may also include a shear force curve that predicts the shear force applied to the BOP shear rams over the simulated conduit shearing process. In certain embodiments, the CAE toolkit can also automatically perform post-processing of the outputs of the simulation, for example, to convert the shear force curve into a shear pressure curve. As such, the disclosed CAE toolkit may enable a designer with no training or experience with CAE or FEA techniques to perform and automate simulations of the operation of a pressure-controlling component design. By enabling the performance of various designs to be simulated and compared under real and complex well scenarios, the CAE toolkit enables the designer to more easily and more quickly optimize the design of the component.

To facilitate discussion, the CAE toolkit is described in the particular context of the simulated testing the design of shear rams of a shear ram BOP. However, it should be appreciated that the systems and methods for simulated testing of component designs may be adapted for the design and testing of other pressure-controlling components or equipment, such as another component of the BOP for the drilling system and/or another component of another device for any type of system (e.g., drilling system, production system).

With the foregoing in mind, FIG. 1 is a block diagram of an embodiment of a drilling system 10 for mineral extraction. The drilling system 10 may be configured to drill (e.g., circulate drilling mud and take drilling cuttings up to surface) for the eventual extraction of extract various minerals and natural resources, including hydrocarbons (e.g., oil and/or natural gas), from the earth and/or to inject substances into the earth. The drilling system 10 may be a land-based system (e.g., a surface system) or an offshore system (e.g., an offshore platform system).

As shown, a BOP stack 12 may be mounted to a wellhead 14, which is coupled to a mineral deposit 16 via a wellbore 18. The wellhead 14 may include or be coupled to any of a variety of other components such as a spool, a hanger, and a "Christmas" tree. The wellhead 14 may return drilling fluid or mud toward a surface during drilling operations, for example. Downhole operations are carried out by a conduit 20 (e.g., drill string) that extends through a central bore 22 of the BOP stack 12, through the wellhead 14, and into the wellbore 18.

As discussed in more detail below, the BOP stack 12 may include one or more BOPs 24 (e.g., ram BOPs), and components (e.g., rams) of the one or more BOPs 24 may be designed and tested using the CAE toolkit disclosed herein. To facilitate discussion, the BOP stack 12 and its components may be described with reference to a vertical axis or direction 30, an axial axis or direction 32, and/or a lateral axis or direction 34.

Figure 2:
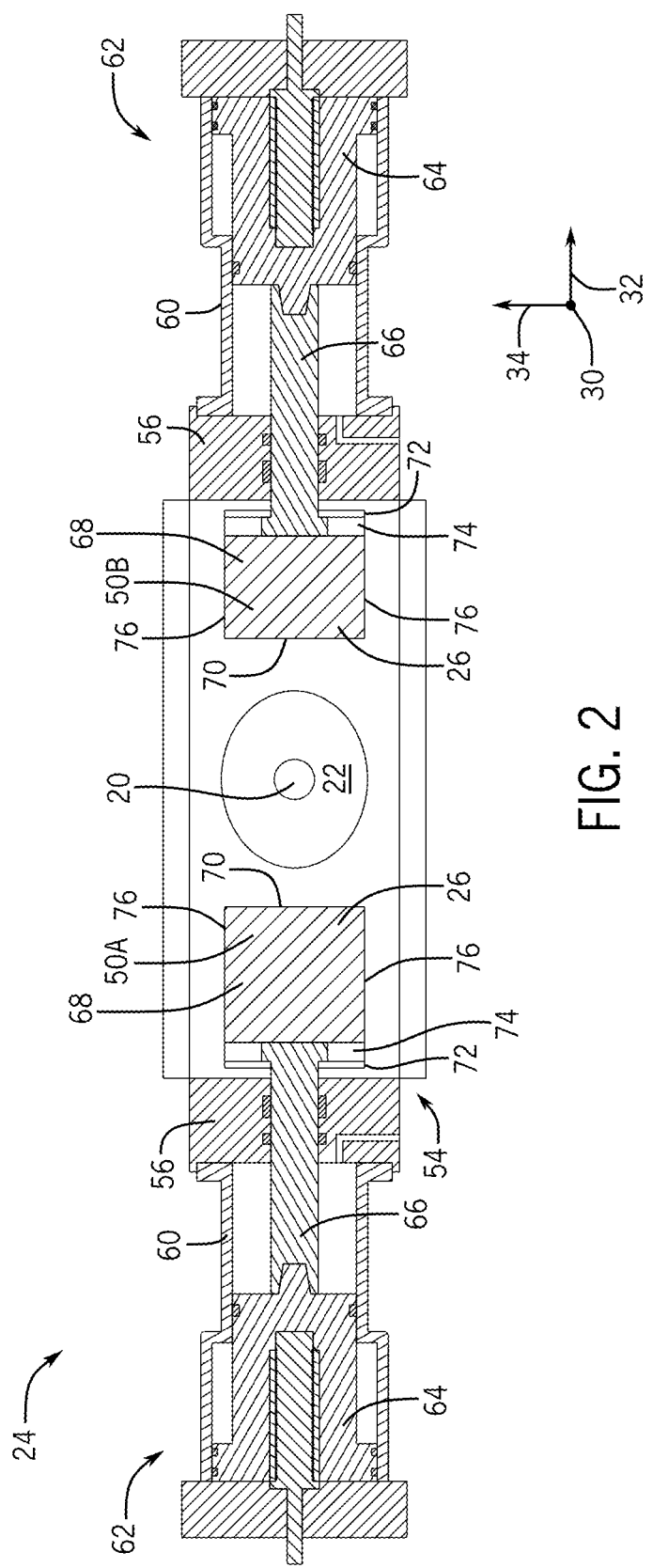
FIG. 2 is a cross-sectional top view of a portion of a blowout preventer (BOP) that may be used in the drilling system of FIG. 1, in accordance with an embodiment of the present disclosure.

FIG. 2 is a cross-sectional top view of a portion of an embodiment of the BOP 24 that may be used in the drilling system 10 of FIG. 1, in accordance with an embodiment of the present disclosure. As shown, the BOP 24 includes opposed rams 50, including upper ram 50A and lower ram 50B, also generally referred to herein as pressure-controlling components 26 of the BOP 24. In the illustrated embodiment, the opposed rams 50 are in an open configuration 54 of the BOP 24 in which the opposed rams 50 are withdrawn from the central bore 22, do not contact the conduit 20, and/or do not contact one another.

As shown, the BOP 24 includes a bonnet flange or housing 56 surrounding the central bore 22. The bonnet flange 56 is generally rectangular in the illustrated embodiment, although the bonnet flange 56 may have any cross-sectional shape, including any polygonal shape and/or annular shape. Bonnet assemblies 60 are mounted on opposite sides of the bonnet flange 56 (e.g., via threaded fasteners). Each bonnet assembly 60 includes an actuator 62, which may include a piston 64 and a connecting rod 66. The actuators 62 may drive the opposed rams 50 toward one another along the axial axis 32 to reach a closed position in which the opposed rams 50 are positioned within the central bore 22, contact and/or shear the conduit 20 to seal the central bore 22, and/or contact one another to seal the central bore 22.

Each of the opposed rams 50 may include a body section 68 (e.g., ram body), a leading surface 70 (e.g., side, portion, wall) and a rearward surface 72 (e.g., side, portion, wall, rearmost surface). The leading surfaces 70 may be positioned proximate to the central bore 22 and may face one another when the opposed rams 50 are installed within the housing 56. The rearward surfaces 72 may be positioned distal from the central bore 22 and proximate to a respective one of the actuators 62 when the opposed rams 50 are installed within the housing 56. The leading surfaces 70 may be configured to couple to and/or support sealing elements (e.g., elastomer or polymer seals) that are configured to seal the central bore 22 in the closed position, and the rearward surfaces 72 may include an attachment interface 74 (e.g., recess) that is configured to engage with the connecting rod 66 of the actuator 62. The body section 68 also includes lateral surfaces 76 (e.g., walls) that are on opposite lateral sides of the body section 68 and that extend along the axial axis 32 between the leading surface 70 and the rearward surface 72. In FIG. 2, the opposed rams 50 have a generally rectangular shape to facilitate discussion; however, it should be appreciated that the opposed rams 50 may have any of a variety of shapes or features (e.g., curved portions to seal against the conduit 20, edges to shear the conduit 20).

Figure 3:
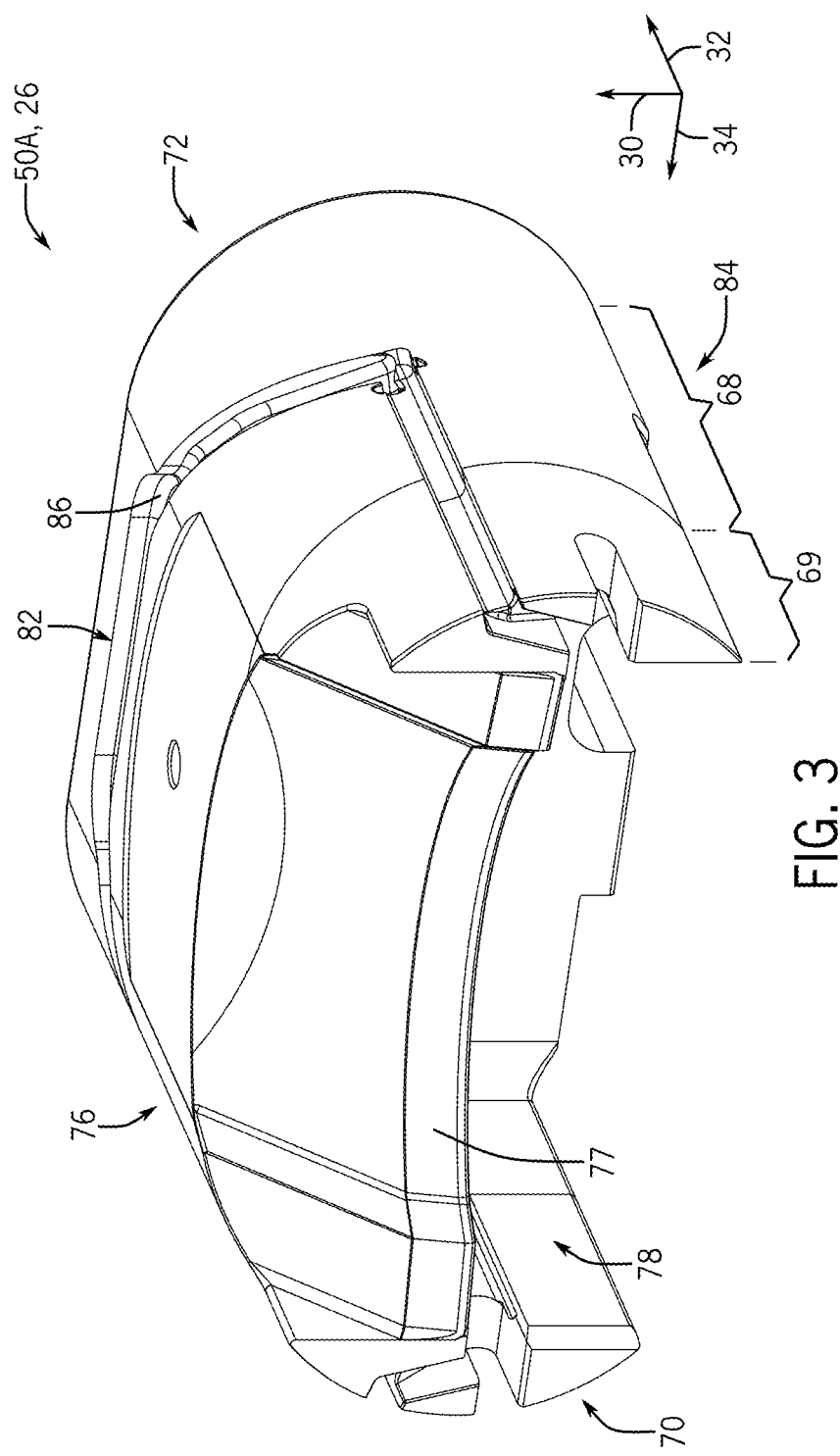
FIG. 3 is a front isometric view of a component, namely an upper ram, that may be used in the BOP of FIG. 2, in accordance with an embodiment of the present disclosure.
Figure 4:
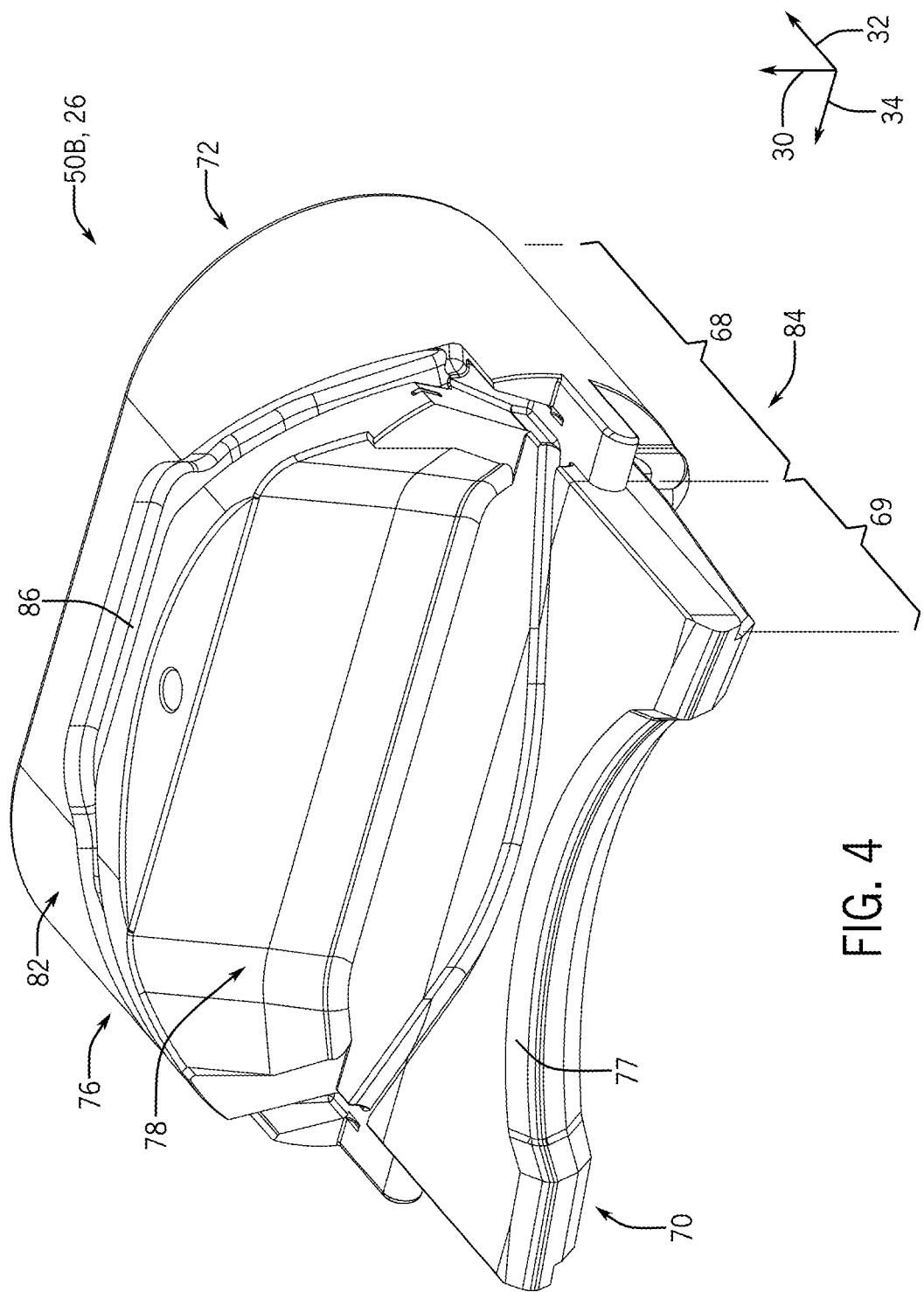
FIG. 4 is a front isometric view of another component, namely a lower ram, that may be used in conjunction with the upper ram of FIG. 3 and the BOP of FIG. 2, in accordance with an embodiment of the present disclosure.

FIG. 3 is a front isometric view of an embodiment of the upper ram 50A, and FIG. 4 is a front isometric view of an embodiment of the lower ram 50B, which may be used together as pressure-controlling components 26 in the embodiment of BOP 24 of FIG. 2. As illustrated in FIGS. 3 and 4, the pressure-controlling components 26 each include the body section 68 and a blade section 69. Each blade section 69 includes the leading surface 70, while the body section 68 includes the rearward surface 72 of the rams 50. Because the rams 50 of FIGS. 3 and 4 are shear rams, each blade section 69 includes a respective edge portion 77 that is formed in the leading surface 70 and that extends along the lateral axis 34 of each of the rams 50. In a closed configuration, the respective edge portions 77 of the upper ram 50A and the lower ram 50B are configured to shear the conduit 20 and/or support the seal elements that seal against the central bore 22 of the BOP illustrated in FIG. 2. However, it should be appreciated that the rams 50 may have any of a variety of other configurations (e.g., the rams 50 may be pipe rams that lack the respective edge portions 77). The blade section 69 of each of the rams 50 of FIGS. 3 and 4 also includes a leading cutout 78 formed in the leading surfaces 70 (e.g., positioned above and below the respective edge portion 77 along the vertical axis 30). The leading surface 70, the rearward surface 72, the lateral surfaces 76, a top surface 82 (e.g., top-most surface), and a bottom surface 84 (e.g., bottom-most surface) may be considered the respective outer surfaces of the rams 50. For the illustrated rams 50, the outer surfaces include grooves or channels 86. In certain embodiments, at least a portion of these grooves may be sealing grooves designed to receive or interface with a polymeric material (e.g., an elastomeric seal), while a portion of these grooves may be sliding grooves designed to receive a slide along a metallic extension during operation of the BOP.

Laboratory Testing of Pressure-Controlling Components

As noted above, when a pressure-controlling component, such as a BOP shear ram, is being designed, a portion of the design process is typically dedicated to performing laboratory testing of the design in a testbed to experimentally verify that the component operates as intended. For example, a shear ram design may be manufactured and loaded into a testbed that physically simulates the BOP body and the conditions of the wellbore. As such, the testbed enables the pressure-controlling components to be physically tested to verify that the design can operate as intended in real and complex well conditions.

For a BOP shear ram design, laboratory testing can be performed to verify that the shearing process can be completed in the testbed, to experimentally determine the shearing pressure applied to the shear rams throughout the shearing process, and experimentally observe deformation of the conduit and the shearing rams as a result of the shearing process. In general, multiple lab test runs are performed using all types (e.g., dimensions, materials) of conduits (e.g., drill pipes) that are expected to be used in combination with the shear ram design.

Figure 5:
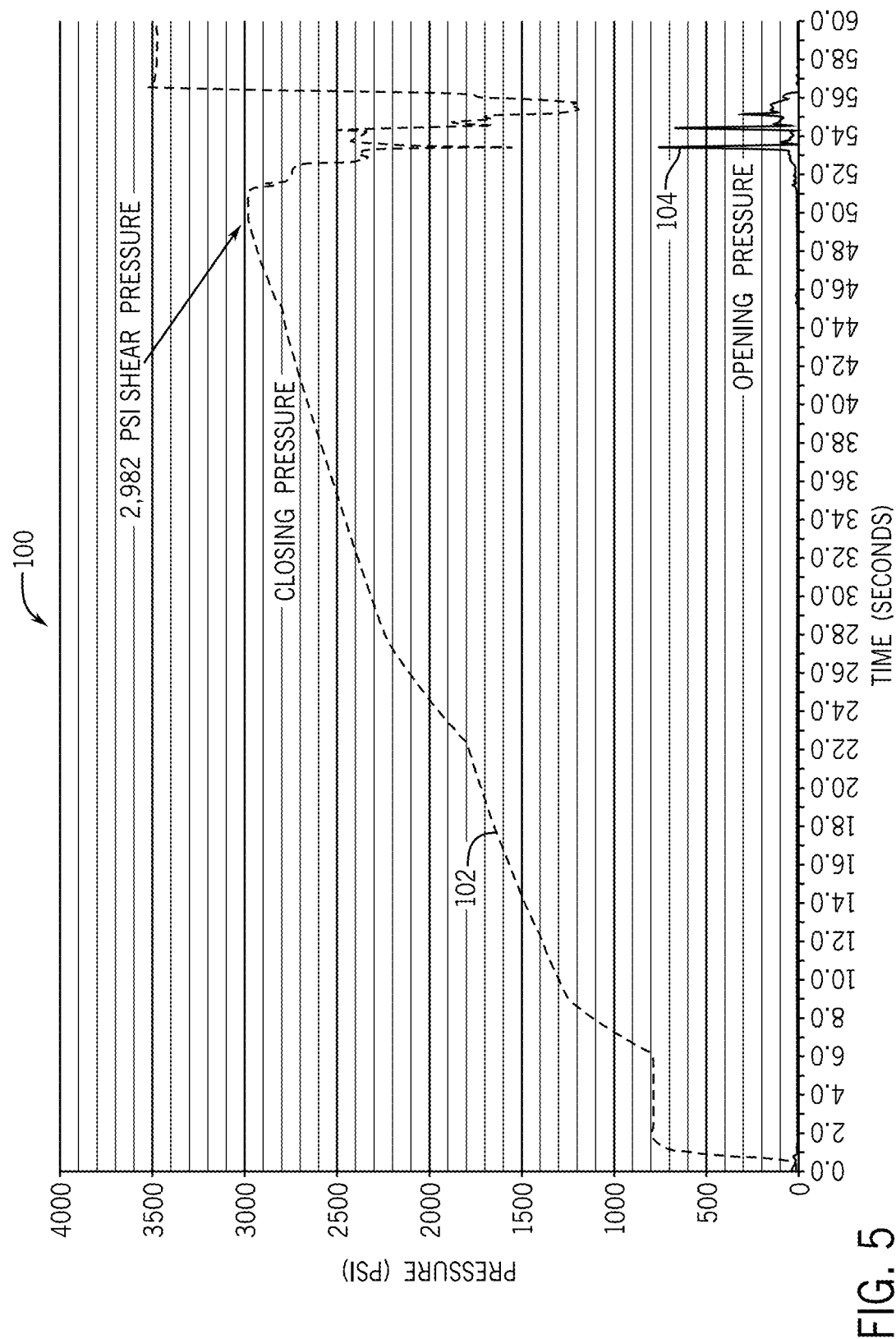
FIG. 5 is a graph illustrating experimentally determined shear pressure data collected during laboratory testing of a BOP shear ram design, in accordance with an embodiment of the present disclosure.

During laboratory testing of a shear ram design, shear pressure measurements are collected throughout the shearing process. Once the shear pressure test is complete, the conduit shearing cross-section and the shear rams are examined and deformations are recorded. FIG. 5 is a graph 100 illustrating experimentally determined shear pressure data collected during laboratory testing of a BOP shear ram design. The graph 100 includes an upper curve 102 that indicates the closing pressure (e.g., hydraulic pressure) applied to the shear rams during the shear pressure test, and includes a lower curve 104 that indicates the opening pressure applied to separate the BOP shear rams once the conduit has been sheared. For this example laboratory shear test, the upper curve 102 indicates a shear pressure of 2,982 pounds per square inch (psi), or approximately 3,000 psi.

However, it is presently recognized that performing this laboratory testing as part of the design process of pressure-controlling components introduces undesired inefficiencies to the design process. For example, when a shear ram design fails a shearing test during laboratory testing, then the design is typically modified or replaced by another shear ram design, and then all of the laboratory testing is repeated on the modified design. This design process is typically repeated until the design of the pressure-controlling component successfully passes all laboratory tests. Given that performing laboratory shearing tests may involve months of lead time and thousands of dollars in costs to be prepared and performed for each pressure-controlling component design, it is presently recognized that relying on laboratory testing for design testing and validation as part of a design process is inefficient and costly. That is, while laboratory testing still serves a useful role in verifying the operation of finalized pressure-controlling component designs prior to implementation, it is presently recognized that it would be advantageous to be able to test and verify the operation of these designs in an earlier stage of the design process with considerably less development time and cost.

CAE/FEA Modeling of Pressure-controlling Component Designs

It is presently recognized that implementing a CAE-based method to validate pressure-controlling component designs during a pressure-controlling component design process can offer advantages over relying solely on laboratory testing. For example, in a CAE-based method, a FEA model may be constructed to simulate the shearing process for a BOP shear ram design. Such FEA models can be used to generate a 3D visualization of the simulated shearing process and predict shearing force applied to the shearing rams throughout the shearing process.

Figure 6:
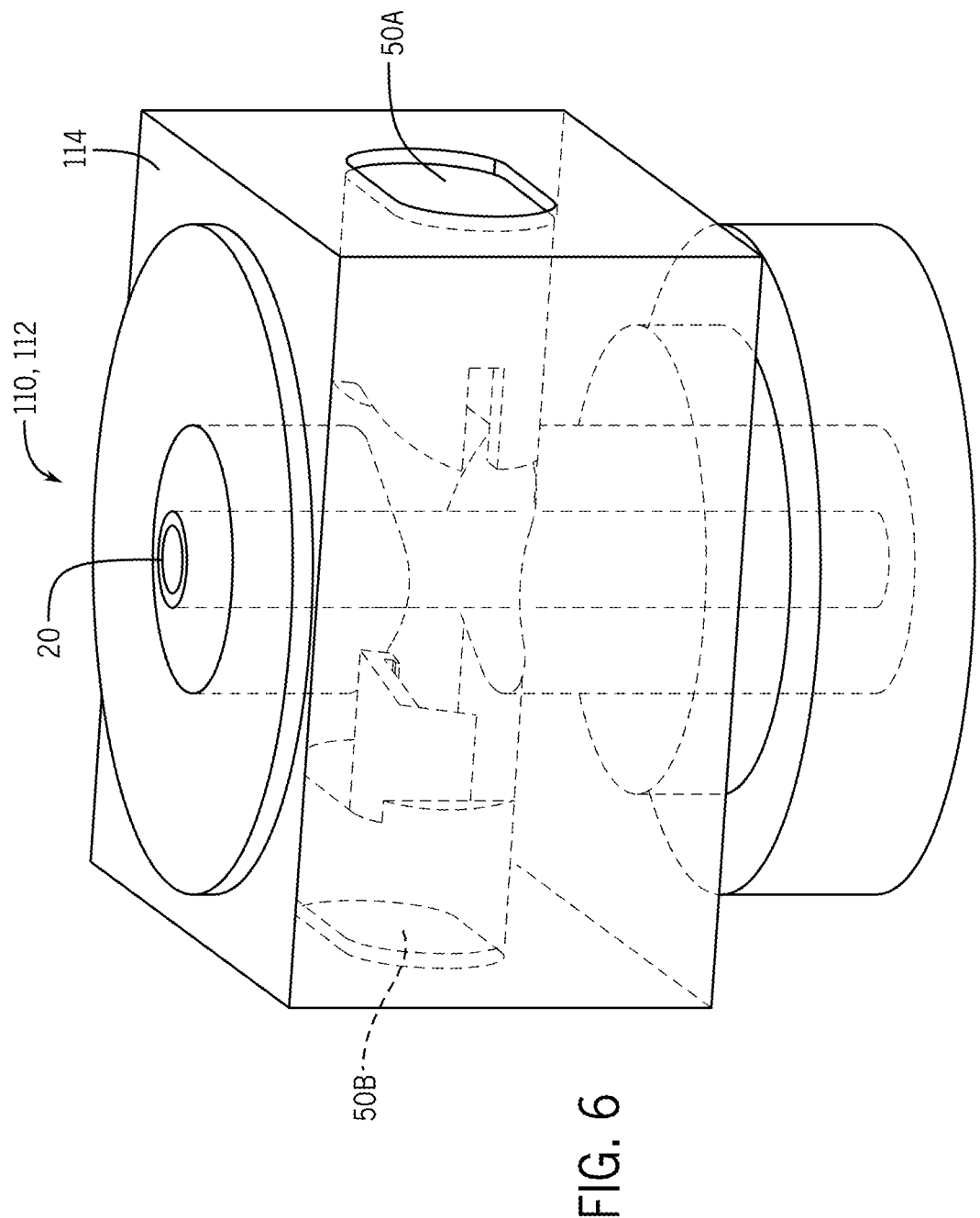
FIG. 6 is an example computer-aided design (CAD) model of a simulated testbed for testing a BOP shear ram design, in accordance with an embodiment of the present disclosure.

For example, FIG. 6 illustrates an embodiment of a system model 110 (e.g., CAD system model) of a simulated testbed 112. For the illustrated embodiment, the simulated testbed 112, which includes a BOP body 114 (e.g., BOP package or casing), shear rams 50 (e.g., upper shear ram 50A and lower shear ram 50B), and conduit 20. Prior to the present disclosure, a modeling and simulation engineer might construct a FEA model based on the system model 110 of the simulated testbed 112 to simulate the shearing process. As discussed below, using the disclosed CAE toolkit, a designer or operator with no knowledge or expertise in FEA modeling or simulation may generate an FEA model to perform simulated testing of pressure-controlling component designs.

Figure 7:
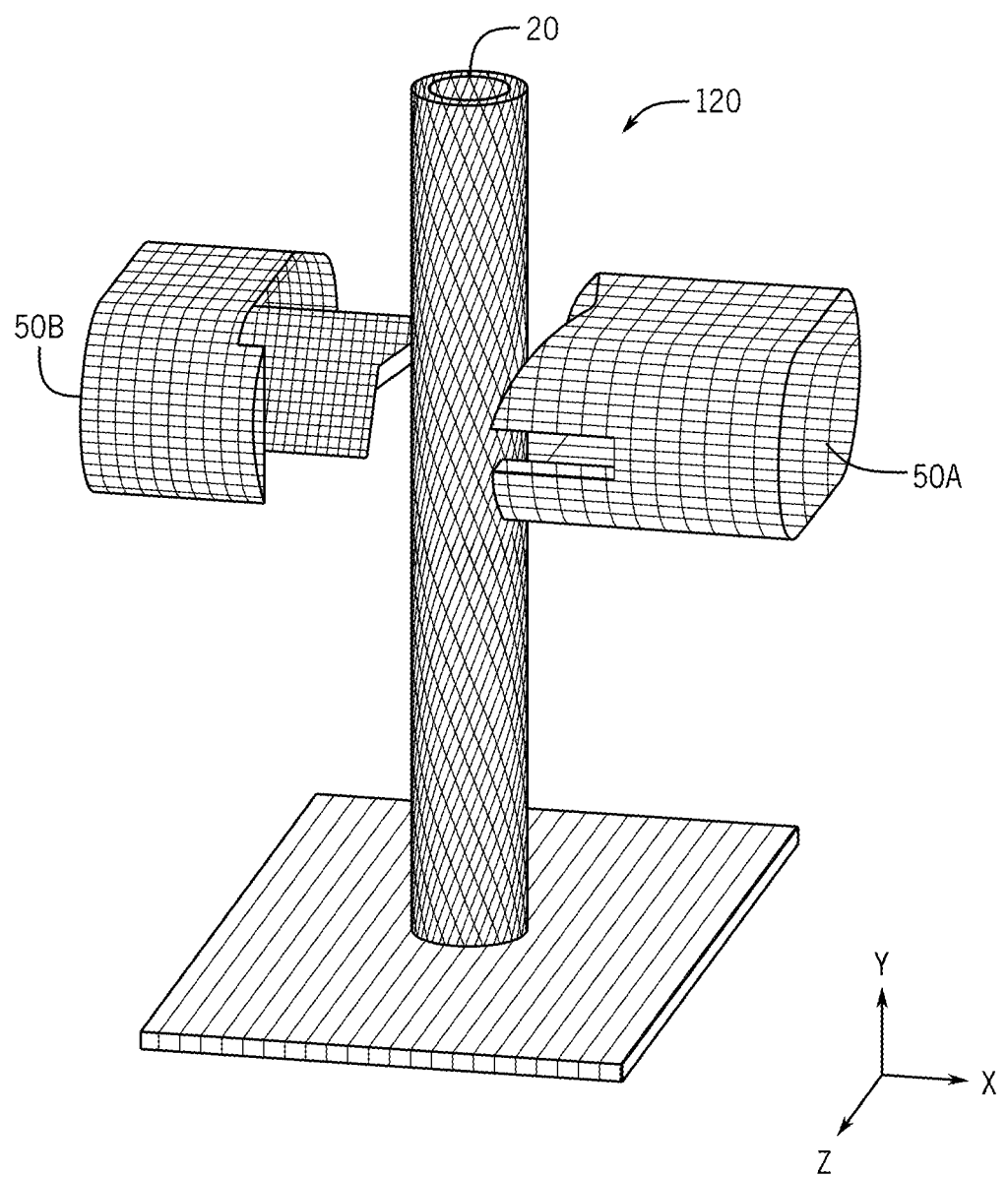
FIG. 7 is an example finite-element analysis (FEA) model of the simulated testbed of FIG. 6, in accordance with an embodiment of the present disclosure.
Figure 8:
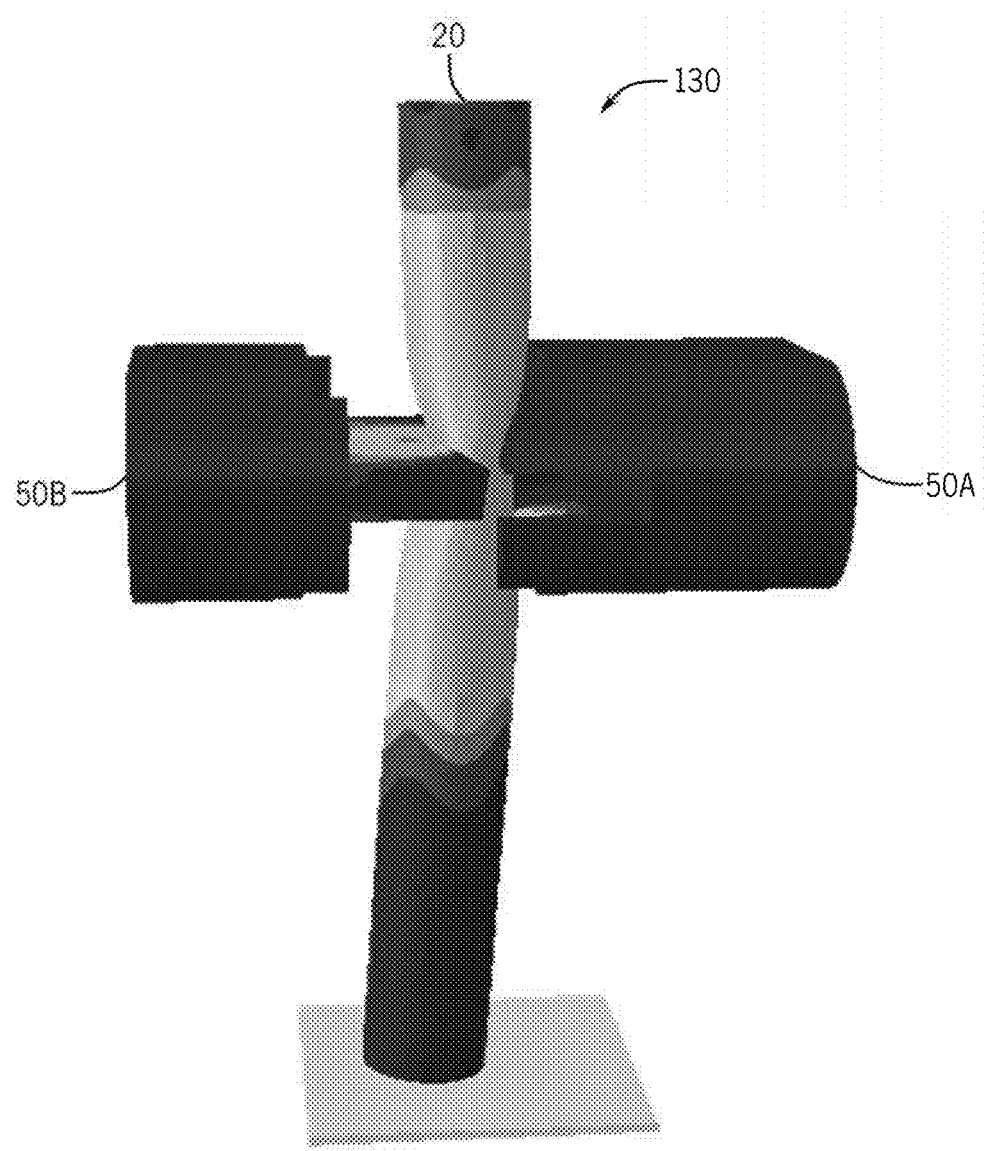
FIG. 8 is a three-dimensional (3D) visualization of conduit and shear ram deformation from a simulated shearing process, in accordance with an embodiment of the present disclosure.
Figure 9:
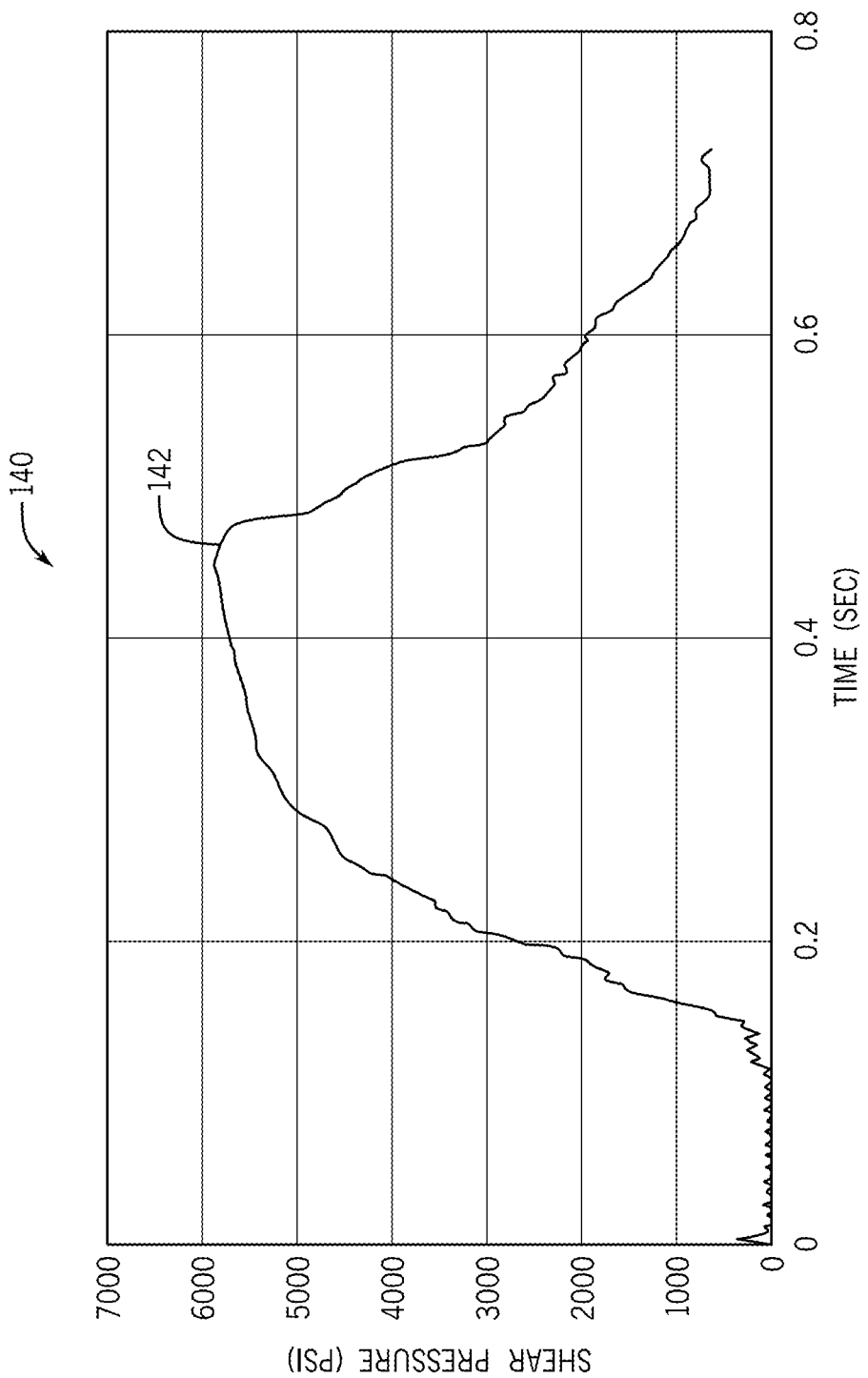
FIG. 9 is a shear pressure curve indicating the shearing pressure over time throughout a simulated shearing process, in accordance with an embodiment of the present disclosure.

FIG. 7 illustrates an embodiment of a FEA model 120 of the simulated testbed 112 of FIG. 6. For the embodiment illustrated in FIG. 7, the FEA model 120 includes only the shear rams 50, and the conduit 20 for the illustrated embodiment. In the illustrated FEA model 120, the conduit 20 is supported from the bottom, and the shear rams 50 are configured to move toward each other to shear the conduit 20 during a shearing process. When the conduit 20 breaks during the simulation, the conduit 20 is highly deformed and is deleted from the FEA model 120. The FEA model 120 determines the conduit deformation, ram deformation, and shearing force throughout the entire simulated shearing process. FIG. 8 is a 3D visualization 130 of deformation and internal strain in the conduit 20 and shear rams 50 during a portion of the simulated shearing process, as predicted by the FEA model 120. FIG. 9 is a shear pressure graph 140 for the simulated shearing process illustrated in FIG. 8, which shows the shear pressure applied to the shear rams 50 during the simulated shearing process. The shear pressure graph 140 includes a shear pressure curve 142 that predicts a maximum shearing pressure of 6000 psi for the example simulated shearing process.

However, it is presently recognized that performing FEA simulation to test designs as part of a design process of pressure-controlling components also presents challenges. For example, FEA simulations typically involve significant effort on the part of the modeling and simulation engineer. That is, prior to the present disclosure, a modeling and simulation engineer would have a substantial amount of training and experience in generating CAE/FEA models, and would spend a substantial amount of time setting up the model, running the simulation, and post-processing the results. As such, prior to the present disclosure, performing FEA simulations involved substantial efforts by specialized engineers, which increases the cost of the design process. Additionally, since each FEA model may take a day or more to be constructed by the modeling and simulation engineer, this creates delays and reduces the efficiency of the overall design process. In other words, since designers and operators of a pressure-controlling component are unable to perform FEA modeling themselves, these designers and operators are typically relegated to waiting for the post-processed results of each FEA modeling operation before modifying the design of the component, creating undesired delays and adding substantial cost to the component design process.

CAE Toolkit for Validation of Pressure-Controlling Component Designs

With the foregoing in mind, present embodiments are directed to a CAE toolkit that enables a user without expert knowledge in FEA simulation and modeling, such as a designer or operator of a pressure-controlling component, to perform a FEA simulation to verify the operation of the component. For example, the disclosed CAE toolkit enables a designer to simulate the shearing process for a BOP shear ram design. The CAE toolkit can be configured to automate the complete modeling and simulation procedure, from model setup to final result generation. Unlike typical FEA modeling, the CAE toolkit only receives simple and generic information on the component design, the application scenario, and the material properties of the system. Since the CAE toolkit does not request that the user provide FEA information, a design engineer without a background or expertise in CAE or FEA can still effectively utilize the CAE toolkit to test designs of pressure-controlling components, and to improve the efficiency of the design process of these components.

Figure 10:
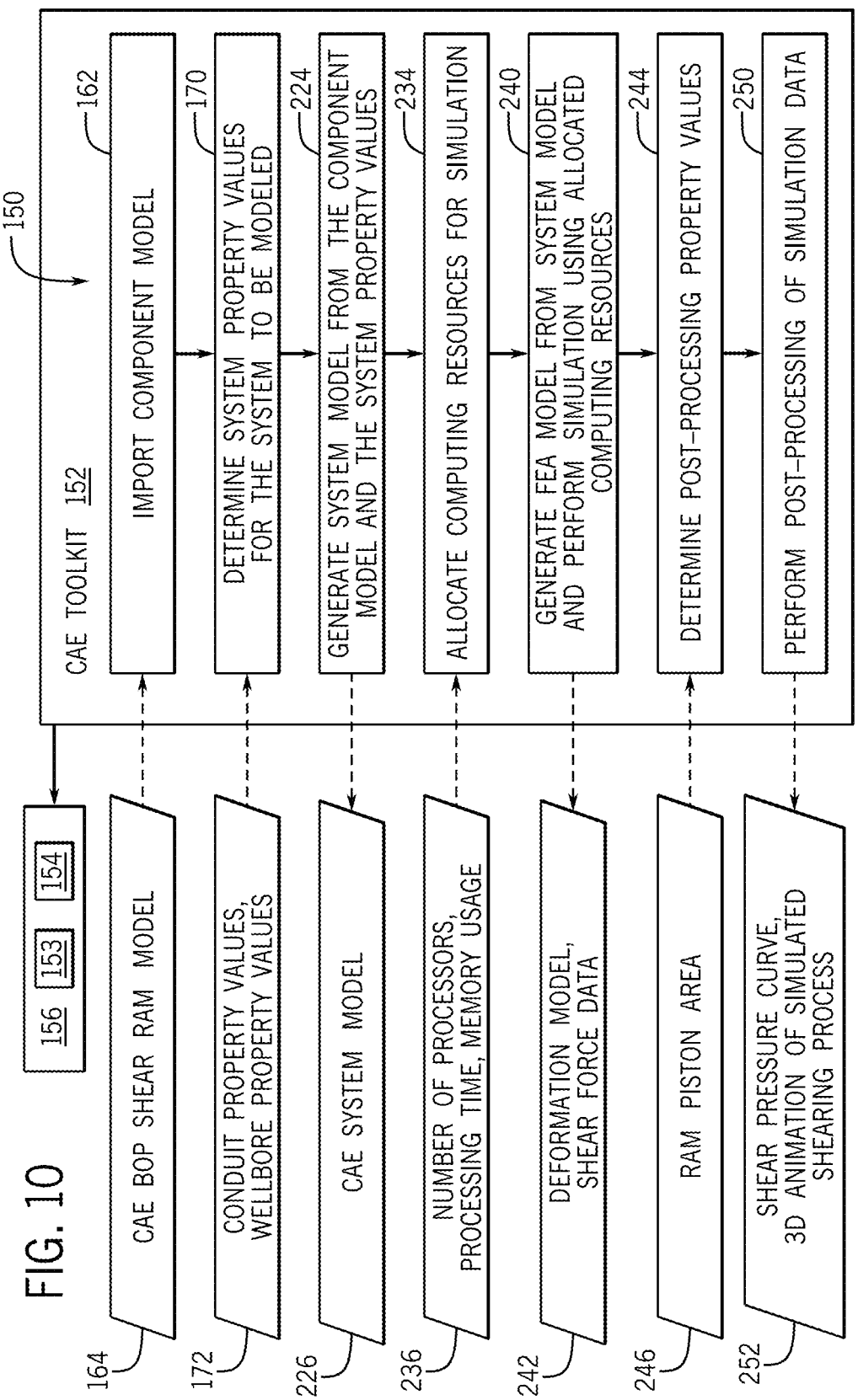
FIG. 10 is a flow diagram illustrating a process whereby a computer-aided engineering (CAE) toolkit configures and performs a simulation of a pressure-controlling component design, in accordance with an embodiment of the present disclosure.

FIG. 10 is a flow diagram illustrating an embodiment of a process 150 whereby the CAE toolkit 152 receives information from a user, performs a simulation based on the received information, and post-processes the results of the simulation. It may be appreciated that the illustrated process 150 is merely an example, and, in other embodiments, the process 150 may include additional steps, repeated steps, omitted steps, and so forth, in accordance with the present disclosure. Additionally, it may be appreciated that, in certain embodiments, the CAE toolkit 152, including the process 150, may be stored in a suitable computer memory 153 (e.g., random access memory (RAM), hard disk drive, solid state disk drive, optical media) and may be executed by suitable processing circuity of processors 154 (e.g., a central processing unit (CPU), a graphics processing unit (GPU), a physics processing unit (PPU)) of a computing system 156 (e.g., a server, a workstation, a laptop).

Figure 11:
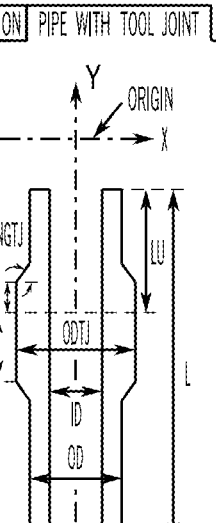
FIG. 11 is an example of a graphical user interface (GUI) of the CAE toolkit, in accordance with an embodiment of the present disclosure.

In certain embodiments, the CAE toolkit 152 may include a graphical user interface (GUI) 160, as illustrated in FIG. 11, which guides the user through the process 150 of FIG. 10. The GUI 160 and any of the other information disclosed herein (e.g., the simulation results) may be presented on a display screen of the computing system 156 or otherwise communicatively coupled to the processing circuitry of processors 154 of the computing system 156. To enhance usability, the CAE toolkit 152 may be integrated with CAE software, and the GUI 160 may be written using Python or another suitable programming language. The process 150 of FIG. 10 is discussed with reference to elements of the GUI 160 of the CAE toolkit 152 illustrated in FIG. 11. It may be appreciated that the GUI 160 illustrated in FIG. 11 is merely an example, and in other embodiments, the GUI 160 may include other user input mechanism or have a different organizational layout relative to the embodiment illustrated in FIG. 11. Additionally, while certain aspects of the illustrated process 150 of FIG. 10 and certain elements of the illustrated GUI 160 of FIG. 11 are particular to the design and simulated testing of BOP shear rams, in other embodiments, these aspects and elements may be different to facilitate the design and simulated testing of other pressure-controlling components, in accordance with the present disclosure.

The embodiment of the process 150 illustrated in FIG. 10 begins with the CAE toolkit 152 importing (block 162) a component model 164 of a pressure-controlling component being designed. For the illustrated embodiment, the CAE toolkit 152 receives inputs from a user indicating a CAE BOP shear ram model as the component model 164, which describes a design of both the upper shear ram 50A and the lower shear ram 50B to be tested. In other embodiments, the CAE toolkit 152 may alternatively receive a CAD model of the pressure-controlling component design. It may be noted that, like a CAD model, a CAE model generally describes the various dimensions of the component; however, the CAE may include information regarding the material properties (e.g., yield strength, toughness, elongation) of various portions of the component. Turning briefly to FIG. 11, in step 1, the illustrated embodiment of the GUI 160 of the CAE toolkit 152 includes a navigation button 166 and a corresponding text box 168, which enable the user to select or identify a file containing the component model 164 to be used by the CAE toolkit 152.

Returning to FIG. 10, the process 150 continues with the CAE toolkit 152 determining (block 170) system property values 172 for the system to be modeled and simulated. That is, while the component model 164 may describe the design of and certain material properties of the pressure-controlling component (e.g., BOP shear rams 50), other parameters regarding the simulated system (e.g., the BOP 24, the conduit 20, the wellbore 18, the wellhead 14, the drilling system 10) may be provided to, or otherwise determined by, the CAE toolkit 152. For the illustrated embodiment, to simulate operation of the BOP shear ram design, the CAE toolkit 152 receives system properties values 172 describing the conduit 20 (e.g., material properties, dimensions, geometry, boundary constraints/conditions) and the well (e.g., dimensions, geometry). It may be appreciated that, when designing other pressure-controlling components, other system property values of the system to be simulated may be provided to, or otherwise determined by, the CAE toolkit 152.

Turning to FIG. 11, in step 2, the illustrated embodiment of the GUI 160 of the CAE toolkit 152 includes a number of suitable user input mechanisms (e.g., drop-down lists, text boxes) that enable the CAE toolkit 152 to receive system property values 172 from the user regarding the properties of the conduit 20, including density 174, elastic modulus 176, poisons ratio 178, yield strength 180, tensile strength 182, percent elongation 184, and percent reduction in area 186. In certain embodiments, the user may use a material type drop-down list 188 to select a defined material type, and one or more of the material properties of the selected material type may be automatically populated based on the selected material and stored material property values of the selected material. However, it may be appreciated that the user may customize any of the parameters of the conduit via the GUI 160, for example, to define a conduit 20 having a new material type. It may be appreciated that, in other embodiments, different material properties may be included in step 2 of the GUI 160.

Also in FIG. 11, in step 3, the illustrated embodiment of the GUI 160 of the CAE toolkit 152 includes a number of suitable user input mechanisms (e.g., drop-down lists, check boxes, text boxes) that enable the CAE toolkit 152 to receive system property values 172 from the user regarding the geometry (e.g., dimensions, positions) of the conduit 20 and the wellbore 18. For example, step 3 of the GUI 160 includes a number of input mechanisms to enable the CAE toolkit 152 to receive property values that describe the dimensions of the conduit 20, including an inner diameter 190, an outer diameter 192, a length 194 of the conduit 20 above the shear plane, a total length 196, and a distance 198 from the shear plane to the origin. The GUI 160 also includes number of input mechanisms to enable the CAE toolkit 152 to receive property values that describe the dimensions of a tool joint of the conduit, when present, including an outer diameter 200, a length 202 of the tool joint above the shear plane, a length 204 of the tool joint below the shear plane, and an angle 206 of the tool joint. The GUI 160 also includes number of input mechanisms to enable the CAE toolkit 152 to receive property values describing the other aspects of the conduit 20 and wellbore 18, including a position 208 of the conduit 20 in the wellbore 18, how the conduit 20 is supported in the wellbore 18 (e.g., bottom, top) 210, total side force 212, tension/compression force 214, and coefficient of friction 216. The GUI 160 further includes number of input mechanisms to enable the CAE toolkit 152 to receive property values describing the other aspects of the geometry of the wellbore 18, including an inner diameter 218, a distance 220 that the wellbore 18 is disposed above the shear plane, and a distance 222 that the wellbore 18 is disposed below the shear plane.

Returning to FIG. 10, the process 150 continues with the CAE toolkit 152 generating (block 224) a system model 226 from the component model 164 and the system property values 172. For the illustrated embodiment, the CAE toolkit 152 generates a system model 226 (e.g., a CAE system model) based on the component model 164 (e.g., the CAE BOP shear ram model) and the system property values 172 (e.g., conduit properties and well properties). Unlike the component model 164, the system model 226 describes the relevant aspects of the overall system being simulated, including both the shear rams 50 and the conduit 20. Turning briefly to FIG. 11, in step 4, the illustrated embodiment of the GUI 160 of the CAE toolkit 152 includes a number of suitable user input mechanisms (e.g., text boxes) that enable the CAE toolkit 152 to receive information from the user regarding a location 228 (e.g., in the memory 153 of the computing system 156) in which the system model 226 will be saved, as well as information regarding the file name 230 and job name 232. It may be noted that, when only the checkboxes associated with steps 1, 2, 3, and 4 of the GUI 160 have been selected, upon receiving input from the user to proceed (e.g., via the apply button 235 or OK button 236), the CAE toolkit 152 will generate the system model 226, but will not proceed to the following steps of the process 150 of FIG. 10 discussed below.

Returning again to FIG. 10, the process 150 continues with the CAE toolkit 152 allocating (block 234) computing resources to perform the simulation of the operation of the pressure-controlling component design. For the illustrated embodiment, the CAE toolkit 152 allocates the computing resources based on computation resource input 236 received from the user, which indicates a number of processors to be used, an amount of processing time, a memory usage limit, or any other suitable input regarding computer resources to carry out the simulation. Turning briefly to FIG. 11, in step 5, the illustrated embodiment of the GUI 160 includes a suitable input mechanism (e.g., a text box) that enables the CAE toolkit 152 to receive the computation resource input 236 from the user, namely a number 238 of processors in the processing circuitry 154 of the computing system 156 that should be used to carry out the simulation. As noted above, the CAE toolkit 152 may only proceed with performing the simulation using the allocated computing resources when the checkbox associated with step 4 is selected. It may be appreciated that, in other embodiments, different computing resources (e.g., a processing time limit, memory usage limit) may be included in step 4 of the GUI 160.

Returning to FIG. 10, the process 150 continues with the CAE toolkit 152 generating (block 240) a FEA model from the system model 226, and then using the FEA model to perform the simulation using the allocated computing resources. For example, the CAE toolkit 152 uses the system model 226 to generate the conduit geometry, assign material properties to the various features, create a fine mesh, and define boundary conditions of the FEA model. After the simulation is complete, the CAE toolkit 152 outputs a set of simulation results 242. For the illustrated embodiment, the simulation results include a deformation model and shear force data (e.g., a shear force graph) based on the simulation. In certain embodiments, the deformation model may be or include a 3D visualization of the deformation and internal strain of the shear rams 50 and the conduit 20 throughout the simulated shearing process. In certain embodiments, the CAE toolkit 152 may create and store files in the manner indicated by the user in step 4 of the GUI 160 illustrated in FIG. 11.

In certain embodiments, the CAE toolkit 152 may also automatically perform post-processing on the simulation results 242. For the embodiment of the process 150 illustrated in FIG. 10, the CAE toolkit 152 determines (block 244) a ram piston area value as a post-processing property value 246 received from the user. Turning briefly to FIG. 11, in step 6, the illustrated embodiment of the GUI 160 includes a suitable input mechanism (e.g., a text box) that enables the CAE toolkit 152 to receive a ram piston area value 248 as a post-processing property value 246. In response to this value being provided and the checkbox associated with step 6 being selected, the CAE toolkit 152 automatically performs post-processing (block 250) of the simulation results 242 based on the received post-processing property value 246. For example, after the simulation is complete, the CAE toolkit 152 may further process the simulation results 242 (e.g., the shear force curve), based on the received post-processing property value 246, to generate post-processed simulation results 252 (e.g., a shear pressure curve). Additionally, in certain embodiments, during post-processing, the CAE toolkit 152 may generate a 3D animation of the simulated shearing process based on the deformation model of the simulation results 242.

It may be appreciated that the CAE toolkit 152 reduces the time involved in setting up and running a FEA simulation of a pressure-controlling component design. That is, while traditional FEA modeling previously involved hours to days of a modeling and simulation engineer's time to configure the simulation, perform the simulation, and post-process the results, the CAE toolkit 152 enables a simulation to be configured in minutes by user, who may be a designer or operator with little or no experience or expertise in FEA modeling. Additionally, the CAE toolkit 152 offers flexibility in that the user can easily adjust and test different conduit positions and boundary constraints, which enables designers optimize the design of a pressure-controlling component by comparing its performance under real and complex well scenarios.

Example: CAE Toolkit Simulated Testing of BOP Shear Ram Design

The operation of an example BOP shear ram design was tested using the CAE toolkit 152 according to the process 150 illustrated in FIG. 10. It may also be noted that the parameter values illustrated in FIG. 11 correspond to the simulated testing of this example BOP shear ram design. Additionally, the experimental shear pressure data presented in FIG. 5 corresponds to laboratory testing of the same example BOP shear ram design.

Figure 12:
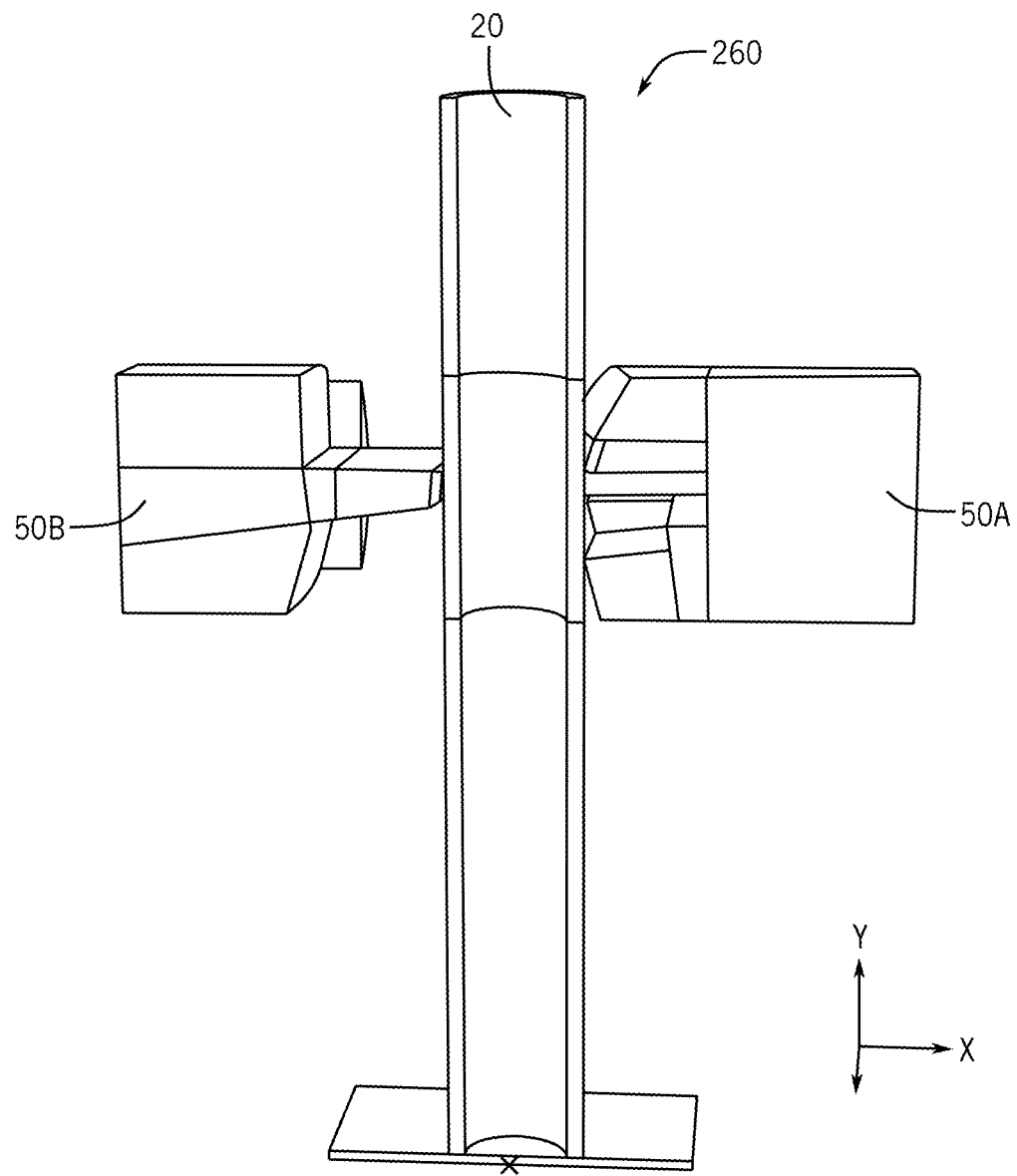
FIG. 12 is an example CAE system model generated by the CAE toolkit for an example BOP shear ram design, in accordance with an embodiment of the present disclosure.

For this example, referring briefly back to FIG. 10, after importing the component model 164 (e.g., the CAE BOP shear ram model) in block 162, and after determining system property values 172 (e.g., conduit properties, well properties) in block 170, the CAE toolkit 152 generates a CAE system model 226. FIG. 12 illustrates an example of a CAE system model 260 generated by the CAE toolkit 152 for this example. For the illustrated embodiment, the CAE system model 226 includes a 6.625 inch (16.8 centimeter) conduit 20 that is supported from the bottom and is located at the center of the wellbore 18 (not illustrated). The shear ram design, conduit material properties, conduit dimensions, boundary conditions, and so forth, are provided to the CAE toolkit via the GUI 160, as illustrated in FIG. 11. For this example, because the geometric plane is symmetric, a half model is selected and applied, which reduces the computational time and cost of the simulation. Based on the CAE system model 260 illustrated in FIG. 12, the CAE toolkit 152 automatically creates a FEA model, runs a simulation, generates simulation results, and post-processes the simulation results.

Figure 13:
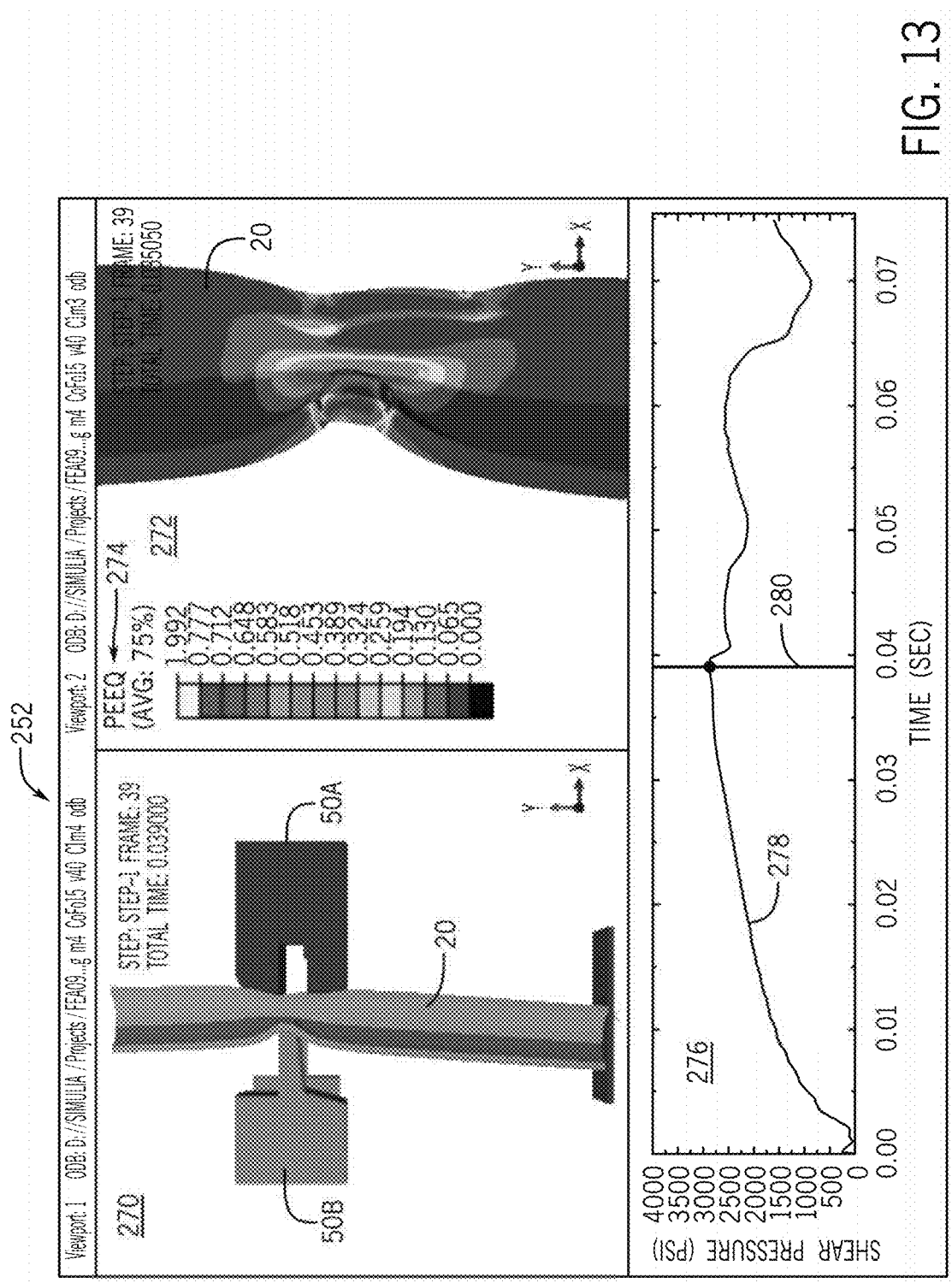
FIG. 13 illustrates post-processed simulation results of a simulation performed by the CAE toolkit based on the example CAE system model of FIG. 12, in accordance with an embodiment of the present disclosure.

FIG. 13 illustrates an embodiment of the post-processed simulation results 252 of the simulated operation of the example BOP shear ram design based on the system property values 172 (e.g., conduit properties, wellbore properties) indicated in FIG. 11. For the illustrated embodiment, the post-processed simulation results 252 include a 3D animation 270 depicting the shear rams 50 and the conduit 20 during the simulated shearing process. The post-processed simulation results 252 also include a 3D image or visualization 272 depicting the deformation and internal strain of the conduit during the simulated shearing process. In certain embodiments, the 3D visualization 272 can be configured to illustrate deformation of only the conduit 20, to illustrate deformation of only the shear rams 50, or to illustrate the deformation to all of these components at during particular points, and from any desired angle, during the simulated shearing process. For the illustrated embodiment, the 3D visualization 272 includes a key 274 and corresponding shading to indicate equivalent plastic strain values (PEEQ), which provides a measure of internal strain in the conduit 20 and/or shear rams 50 as a result of deformation during the simulated shearing process.

The embodiment of the post-processed simulation results 252 illustrated in FIG. 13 also include shear pressure graph 276 with a shear pressure curve 278 indicating the pressure applied to the shear rams 50 throughout the simulated shearing process. The shear pressure curve 278 indicates a predicted maximum shearing pressure of 2925 psi, which corresponds well with the laboratory test measurement of 2982 psi for the same BOP shear ram design (e.g., less than 2% difference), as indicated in FIG. 5. For the illustrated embodiment, the user can move the vertical line 280 on the graph 276 to indicate a particular point in time, and the 3D animation 270 and the 3D visualization 272 are automatically updated to present the corresponding information related to that point in time during the simulated shearing process.

Figure 14:
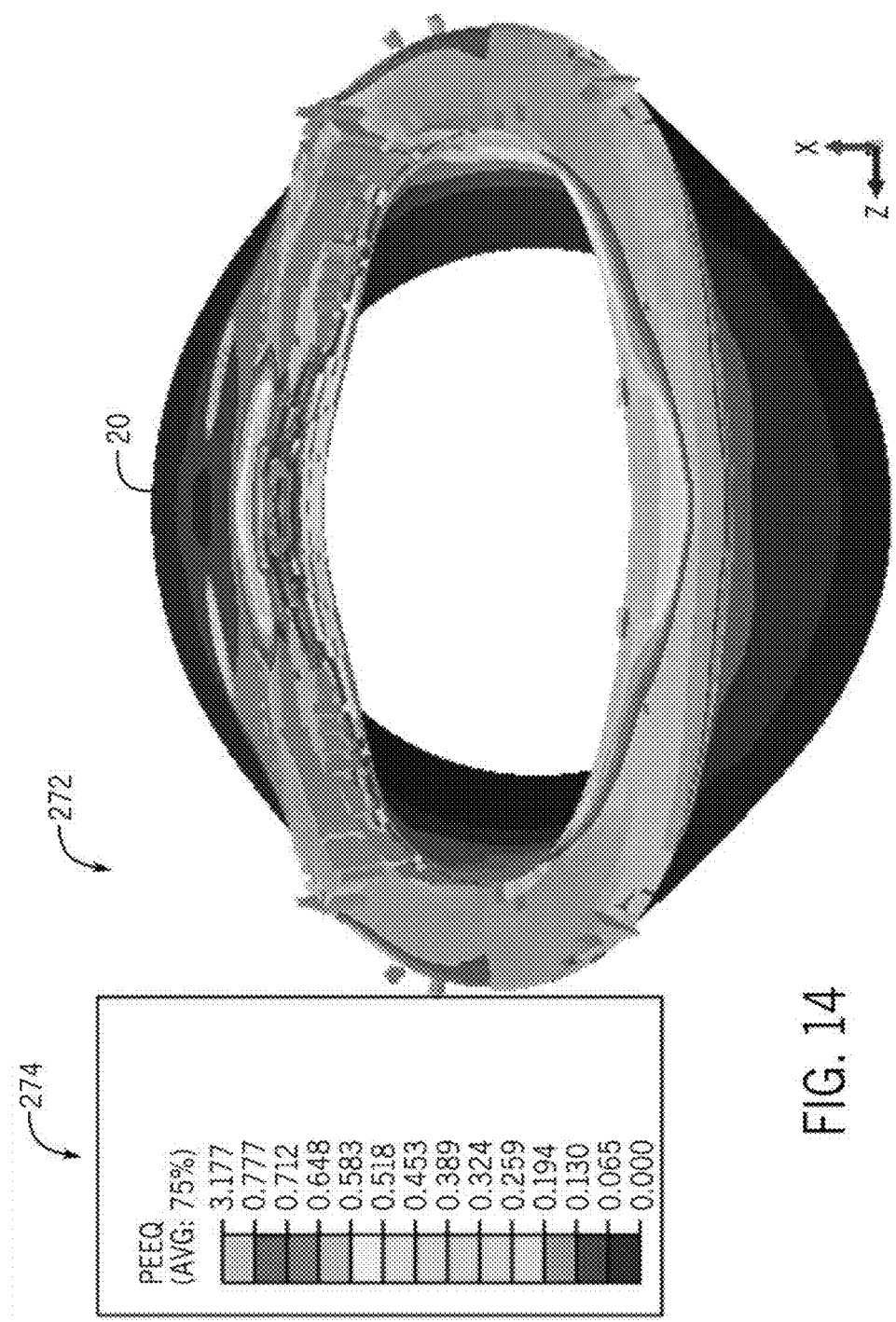
FIG. 14 is a 3D visualization of a cross-section of a sheared conduit that corresponds to the simulation results of FIG. 13, in accordance with an embodiment of the present disclosure.
Figure 15:
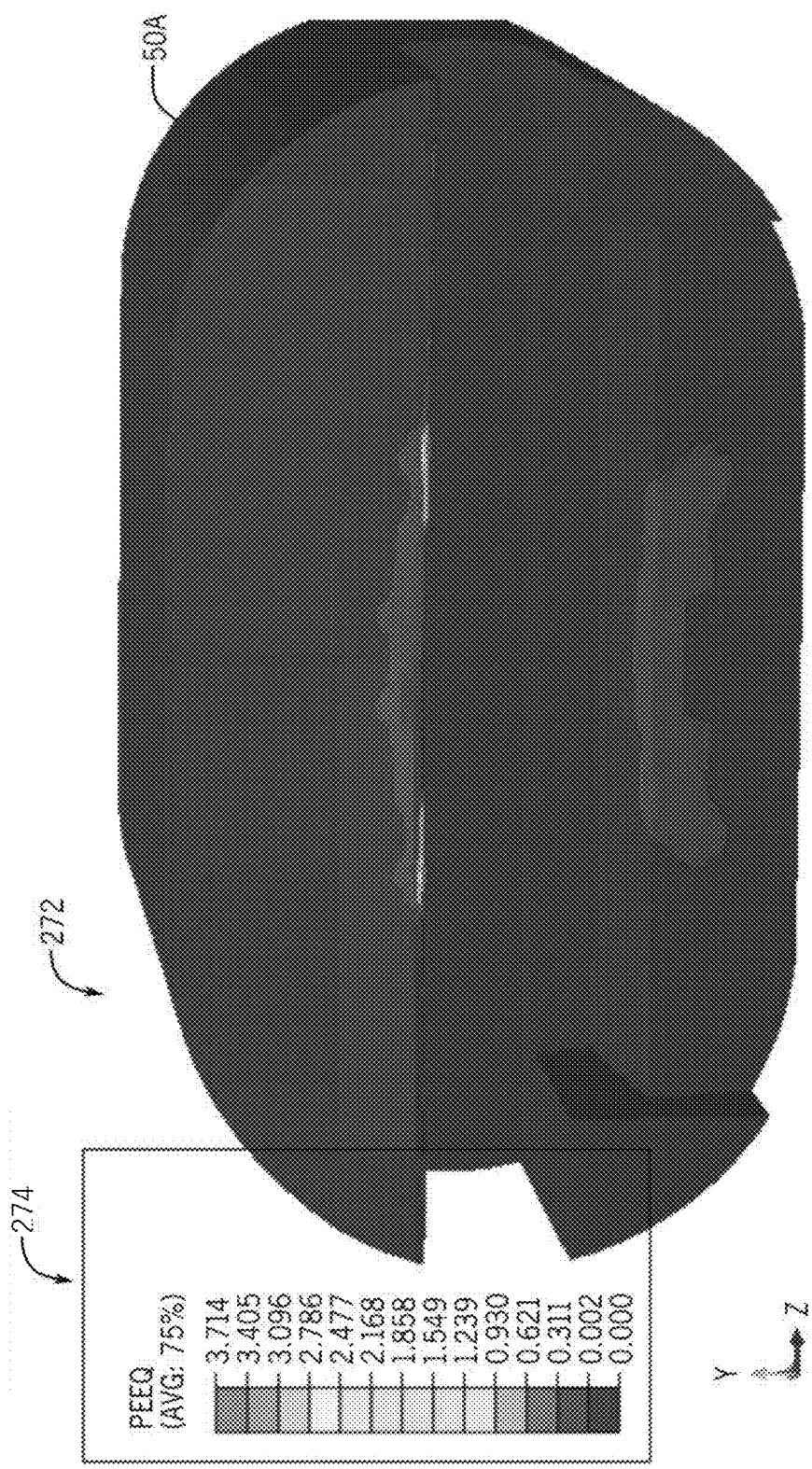
FIGS. 15 and 16 are 3D visualizations of shear rams that correspond to the simulation results of FIG. 13, in accordance with an embodiment of the present disclosure.
Figure 16:
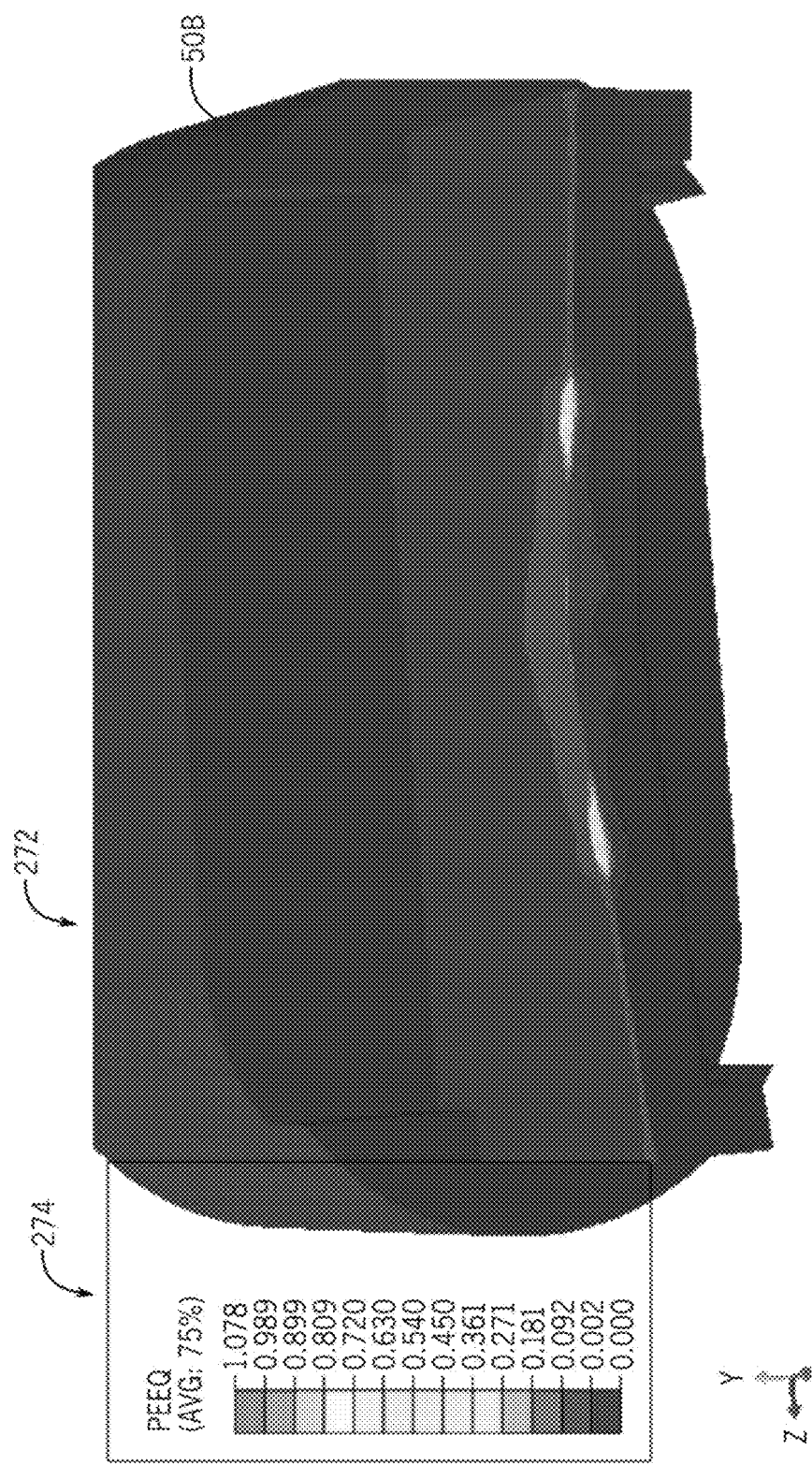

FIG. 14 is another 3D visualization 272 (e.g., a cross-sectional view) of the sheared conduit 20 from the example simulated shearing process. The predicted deformation of the conduit 20 from the simulation, as illustrated by the 3D visualization 272, corresponds well to the deformation observed for the actual conduit 20 during laboratory testing of the same BOP shear ram design. Similarly, FIGS. 15 and 16 are 3D visualizations of the shear rams 50A and 50B from the example simulated shearing process. Again, the predicted deformation of the shear rams 50 from the simulation corresponds well with the deformation observed for the same BOP shear ram design during laboratory testing. To further verify the accuracy of the CAE toolkit 152, the CAE toolkit 152 was also applied to perform simulations over a range of pressure values between 1000 psi and 6000 psi and demonstrated good agreement between the predicted and experimentally determined values. As such, the CAE toolkit 152 provides an accurate and effective tool to simulate the operation of pressure-controlling component designs, as verified by laboratory testing results.

The disclosed techniques enable simulated testing of designs of pressure-controlling components for pressure-controlling equipment used in oil and gas applications. The disclosed CAE toolkit automates and integrates the process from computer-aided design (CAD) to simulation of operation, thereby simplifying simulation and enhancing the design optimization process. The CAE toolkit does not require CAE/FEA domain knowledge, which enables the modeling and simulation work to be performed by designers during the design process of a pressure-controlling component. The CAE toolkit also reduces the time involved in configuring, running, and post-processing a simulation from many hours to several minutes. The accuracy of the CAE toolkit method has been verified over a range of different of conduit dimensions and pressures, and demonstrates good agreement with experimental data.

While the disclosure may be susceptible to various modifications and alternative forms, specific embodiments have been shown by way of example in the drawings and have been described in detail herein. However, it should be understood that the disclosure is not intended to be limited to the particular forms disclosed. Rather, the disclosure is to cover all modifications, equivalents, and alternatives falling within the spirit and scope of the disclosure as defined by the following appended claims.

The invention claimed is:

1. A computing system, comprising:
at least one memory configured to store a computer-aided engineering (CAE) toolkit;
at least one processor configured to:
present a graphical user interface (GUI) of the CAE toolkit, wherein the GUI of the CAE toolkit is not configured to receive finite element analysis (FEA) information input from a user, the FEA information input including FEA meshing information and FEA boundary condition information; and
execute instructions of the CAE toolkit to perform actions comprising:
importing a component model of a blowout preventer (BOP) shear ram;
receiving, from the user via the GUI, system property values including one or more conduit properties and one or more wellbore properties of a system including the BOP shear ram, wherein the one or more conduit properties include a boundary condition of a conduit;
generating a system model of the system, the system model including the BOP shear ram and the conduit, based on the component model and the system property values;
automatically generating a finite-element analysis (FEA) model based on the system model, wherein automatically generating the FEA model includes:
automatically defining boundary conditions of the FEA model without receiving the FEA boundary condition information input from the user; and
automatically creating a meshing for the FEA model without receiving the FEA meshing information input from the user;
automatically using the FEA model to perform a simulation of an operation of the BOP shear ram in the system to generate simulation results including deformation of the conduit, deformation of the BOP shear ram, and shearing force during the operation of the BOP shear ram; and
automatically post-processing the simulation results to generate post-processed simulation results including at least one of (i) a shear pressure curve based on the shearing force simulation results or (ii) a 3D animation of the operation of the BOP shear ram based on the deformation of the conduit simulated results and on the deformation of the BOP shear ram simulation results.

2. The computing system of claim 1, wherein the GUI is configured to receive, from the user, a location of the component model, and wherein the component model is imported from the location.

3. The computing system of claim 1, wherein the GUI comprises:
a first set of user input mechanisms configured to receive the one or more conduit properties, wherein the one or more conduit properties comprises material properties of the conduit, dimensions of the conduit, a location of the conduit in a wellbore, or any combination thereof; and
a second set of user input mechanisms configured to receive a the one or more wellbore properties, wherein the one or more wellbore properties comprise dimensions of the wellbore, a geometry of the wellbore, or any combination thereof.

4. The computing system of claim 1, wherein the GUI comprises a user input mechanism configured to receive an indication of computing resources to be used to perform the simulation, and wherein the at least one processor is configured to execute the instructions of the CAE toolkit to perform actions comprising:
allocating computing resources to perform the simulation based on the indication of computing resources.

5. The computing system of claim 1, wherein the GUI comprises an input mechanism configured to receive a post-processing value, and wherein the at least one processor is configured to execute the instructions of the CAE toolkit to perform actions comprising:
post-processing the simulation results based on the post-processing value to generate the post-processed simulation results.

6. The computing system of claim 5, wherein the post-processing value comprises ram piston area.

7. The computing system of claim 1, wherein the component model is a CAE model of the BOP shear ram, and wherein the CAE model describes dimensions and material properties of a pressure-controlling component.

8. A method of using a computer-aided engineering (CAE) toolkit to simulate operation of a blowout preventer (BOP) shear ram for use in an oil field services industry, the method comprising:
presenting a graphical user interface (GUI) of the CAE toolkit, wherein the GUI of the CAE toolkit is not configured to receive finite element analysis (FEA) information input from a user, the FEA information input including FEA meshing information and FEA boundary condition information;
receiving, from the user via the GUI, a location of a component model of the BOP shear ram;
receiving, from the user via the GUI, system property values including one or more conduit properties and one or more wellbore properties of a system including the BOP shear ram, wherein the one or more conduit properties includes a boundary condition of a conduit;
generating a system model of the system, the system model including the BOP shear ram and the conduit, based on the component model and the system property values;
automatically generating, by the CAE toolkit, a finite-element analysis (FEA) model based on the system model, wherein automatically generating the FEA model includes:
automatically defining boundary conditions of the FEA model without receiving the FEA boundary condition information input from the user; and
automatically creating a meshing for the FEA model without receiving the FEA meshing information input from the user;
automatically using the FEA model to perform a simulation of an operation of the BOP shear ram in the system to generate simulation results including deformation of the conduit, deformation of the BOP shear ram, and shearing force during the operation of the BOP shear ram; and
automatically post-processing the simulation results to generate post-processed simulation results including at least one of (i) a shear pressure curve based on the shearing force simulation results or (ii) a 3D animation of the operation of the BOP shear ram based on the deformation of the conduit simulated results and on the deformation of the BOP shear ram simulation results.

9. The method of claim 8, further comprising:
receiving, via the GUI, an indication of computing resources to be used to perform the simulation; and
allocating computing resources to perform the simulation based on the indication of computing resources.

10. The method of claim 8, further comprising:
receiving, via the GUI, a second location to store the system model; and
storing the system model at the second location after generating the system model.

11. The method of claim 8, wherein the GUI comprises an input mechanism configured to receive a ram piston area.

12. A non-transitory, computer-readable medium storing instructions of a computer-aided engineering toolkit executable by a processor of a computing system, the instructions comprising instructions to:
present a graphical user interface (GUI) of the CAE toolkit, wherein the GUI of the CAE toolkit is not configured to receive finite element analysis (FEA) information input from a user, the FEA information input including FEA meshing information and FEA boundary condition information;
receive, from the user via the GUI, a location of a component model of a blowout preventer (BOP) shear ram;
receive, from the user via the GUI, system property values including one or more conduit properties and one or more wellbore properties of a system including the BOP shear ram, wherein the one or more conduit properties include a boundary condition of a conduit;
generate a system model of the system, the system model including the BOP shear ram and the conduit, based on the component model and the system property values;
automatically generate, by the CAE toolkit, a finite-element analysis (FEA) model based on the system model, wherein automatically generating the FEA model includes:
automatically defining boundary conditions of the FEA model without receiving the FEA boundary condition information input from the user; and
automatically creating a meshing for the FEA model without receiving the FEA meshing information input from the user;
automatically use the FEA model to perform a simulation of an operation of the BOP shear ram in the system to generate simulation results including deformation of the conduit, deformation of the BOP shear ram, and shearing force during the operation of the BOP shear ram;
receive, from the user via the GUI, a post-processing value; and
automatically post-process the simulation results based on the post-processing value to generate post-processed simulation results including at least one of (i) a shear pressure curve based on the shearing force simulation results or (ii) a 3D animation of the operation of the BOP shear ram based on the deformation of the conduit simulated results and on the deformation of the BOP shear ram simulation results.

13. The non-transitory, computer-readable medium of claim 12, wherein the GUI comprises:
a first set of user input mechanisms configured to receive the one or more conduit properties; and
a second set of user input mechanisms configured to receive the one or more wellbore properties.

14. The non-transitory, computer-readable medium of claim 12, wherein the component model is a CAE model of the BOP shear ram.

\* \* \* \* \*